United States Patent
Nakamura et al.

(10) Patent No.: US 6,528,910 B2
(45) Date of Patent: Mar. 4, 2003

(54) COOLING ARRANGEMENT OF VEHICLE ROTARY ELECTRIC MACHINE

(75) Inventors: Shigenobu Nakamura, Anjo (JP); Shin Kusase, Obu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/878,247

(22) Filed: Jun. 12, 2001

(65) Prior Publication Data

US 2001/0054852 A1 Dec. 27, 2001

(30) Foreign Application Priority Data

Jun. 21, 2000 (JP) ........................................ 2000-186277

(51) Int. Cl.[7] .............................. H02K 9/00; H02K 5/00
(52) U.S. Cl. ........................................... 310/58; 310/89
(58) Field of Search ................................. 310/179, 180, 310/254, 258, 259, 260, 208, 201, 58, 59, 60 R, 60 A, 89, 62

(56) References Cited

U.S. PATENT DOCUMENTS

| 4,659,950 A | * | 4/1987 | Gotoh | 310/59 |
| 4,757,221 A | * | 7/1988 | Kurihashi et al. | 310/62 |
| 4,908,541 A | * | 3/1990 | Kawazoe et al. | 310/63 |
| 5,021,696 A | * | 6/1991 | Nelson | 310/62 |
| 5,955,804 A | * | 9/1999 | Kusase et al. | 310/59 |
| 6,011,332 A | * | 1/2000 | Umeda et al. | 310/58 |
| 6,049,154 A | | 4/2000 | Asao et al. | 310/201 |

FOREIGN PATENT DOCUMENTS

| JP | A-4-24939 | 4/1992 |
| JP | A-8-275442 | 10/1996 |

* cited by examiner

Primary Examiner—Tran Nguyen
(74) Attorney, Agent, or Firm—Oliff & Berridge, PLC

(57) ABSTRACT

A vehicle rotary electric machine includes a rotor having a plurality of claw-shaped pole pieces, a cooling fan, a stator core, a stator winding and a frame. A coil-end-gap is formed along the axial end of the stator core between outside portions of the stator winding extending from each pair of adjacent slots, and a cylindrical wall member is disposed between the frame and coil-ends of the stator winding.

7 Claims, 4 Drawing Sheets

US 6,528,910 B2

COOLING ARRANGEMENT OF VEHICLE ROTARY ELECTRIC MACHINE

CROSS REFERENCE TO RELATED APPLICATION

The present application is based on and claims priority from Japanese Patent Application 2000-186277 filed Jun. 21, 2000, the contents of which are incorporated herein by reference.

BACKGROUND OF THE INVENTION

1. Field of the Invention

The present invention relates to a rotary electric machine and, particularly, a stator arrangement of an ac generator.

2. Description of the Related Art

Recently, compact, powerful and highly efficient vehicle rotary electric machines such as AC generators have been manufactured to meet demand for reduction in idling speed of engines in view of the environmental protection, in weight of vehicles in view of fuel consumption and in the space of engine compartments in view of more comfortable passenger compartments. It is also necessary to provide rotary electric machines that are resistant to environmental hazard such as car-washing shampoo, salt water or other foreign substances, which may get in engine compartment.

In order to provide a compact, powerful and highly efficient AC generator, a cooling fan is fixed to an end of magnetic poles of the rotor thereof. JP-B2-4-24939 discloses an AC generator in which coil ends of each phase coil of a stator winding is made flat to form gaps so that cooling air can flow through the gaps. U.S. Pat. No. 6,049,154 or the corresponding Japanese Patent Application, JP-A-11-299153, discloses a step of shaping a stator winding, in which coil ends are shaped to prevent the coil ends from interfering with each other to eliminate insulation failure. In this structure, each wire extended from a slot is bent inwardly at the middle thereof and inserted into another slot that is spaced apart at a prescribed number of slots. Therefore, a plurality of wires are lined up at the middle bent portion in a circumferential direction.

JP-A-8-275442 discloses an AC generator in which rubber or other thermoplastic resin mixed with silica is filled between the outer periphery of coil ends and a frame so that heat of the stator winding can be transmitted to the frame.

In the AC generator disclosed in JP-B2-4-24939, coil ends overlap each other in the circumferential direction of the AC generator. Therefore, it is difficult to form cooling air passages in the coil ends.

In the AC generator disclosed in U.S. Pat. No. 6,049,154 (or JP-A-11-299153), large spaces are formed at the middle of each bundle of coil ends. However, no space is formed at the remainder of the bundle of the coil ends, and, therefore, the cooling air does not cool the coil ends effectively. If some spaces are formed in the remainder of the bundle of the coil ends, the bundle becomes bulky and may contact the frame. This may cause insulation failure.

In the AC generator disclosed in JP-A-8-275442, the thermoplastic resin may be damaged by salt water, washing shampoo or other foreign substances, thereby causing insulation failure.

SUMMARY OF THE INVENTION

Therefore, a main object of the invention is to provide a compact, powerful and highly efficient vehicle rotary electric machine that has an improved cooling arrangement.

A vehicle AC generator according to a feature of the invention includes a rotor having a plurality of claw-shaped pole pieces forming a cooling fan, a cooling fan fixed to an end of the rotor, a stator core which has a plurality of slots and a stator winding and a frame. A coil-end-gap is formed along an axial end of the stator core between outside portions of the stator winding extending from each pair of adjacent slots, and a wall member is disposed between the frame and the coil ends of the stator winding.

Because the rotor having a plurality of claw-shaped pole pieces that function as a fan, cooling air is driven toward the coil-end gaps. Then, the cooling air is guided by the wall member to flow along the whole outer surface of the coil ends. As a result, the coil-ends are effectively cooled.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

A vehicle AC generator according to a preferred embodiment of the invention is described with reference to FIGS. 1–4.

Figure 4:
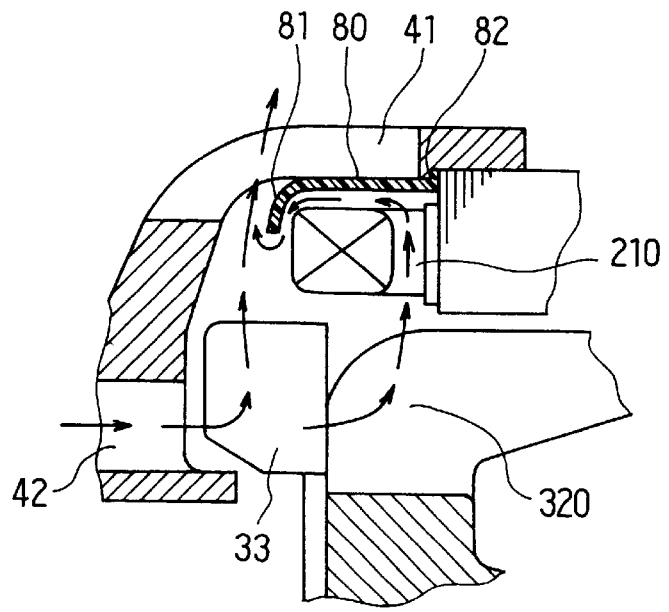
FIG. 4 is a schematic fragmentary cross-sectional side view of a portion around coil ends of the AC generator according to the preferred embodiment.

A vehicle AC generator 1 is driven by an engine via a pulley 5. The pulley 3 rotates a rotor 3 via a shaft 31. When field current is supplied to a field coil 34 of the rotor 3 via slip rings 35, a pair of pole core 32 is polarized. The pair of pole cores 32 has a plurality of claw pole pieces that form a fan 320 at the base thereof, as shown in FIG. 4.

Accordingly, AC voltage is generated in a stator winding 21 of a stator 2, and DC power is provided at output terminals of a rectifier 6 that is connected to a plurality of lead wires 21c extended from the stator winding 21. Cooling air is taken by a pair of cooling fans 33, which is fixed to the pair of pole cores 32 at opposite ends thereof, into the inside from openings 42, which are formed at opposite ends of a pair of frames 4, and is discharged from openings 41, which are formed at radially outside portion of the pair of frames 4. The pair of frames 4 supports the rotor 3 via a pair of bearings and the stator 2 by a plurality of bolts.

The stator winding 21 is comprised of in-slot portions 21*b* disposed in the plurality of slots and outside portions that form coil-ends 21*a* disposed at the opposite axial ends of a stator core 22. The stator winding 21 is a star-connected or delta-connected three-phase winding, which is comprised of X-, Y- and Z-phase windings. There is a coil-end gap 210 along an axial end of the stator core 22 between bases of the outside portions or the coil-ends 21*a* extending from each pair of adjacent slots.

Figure 1:
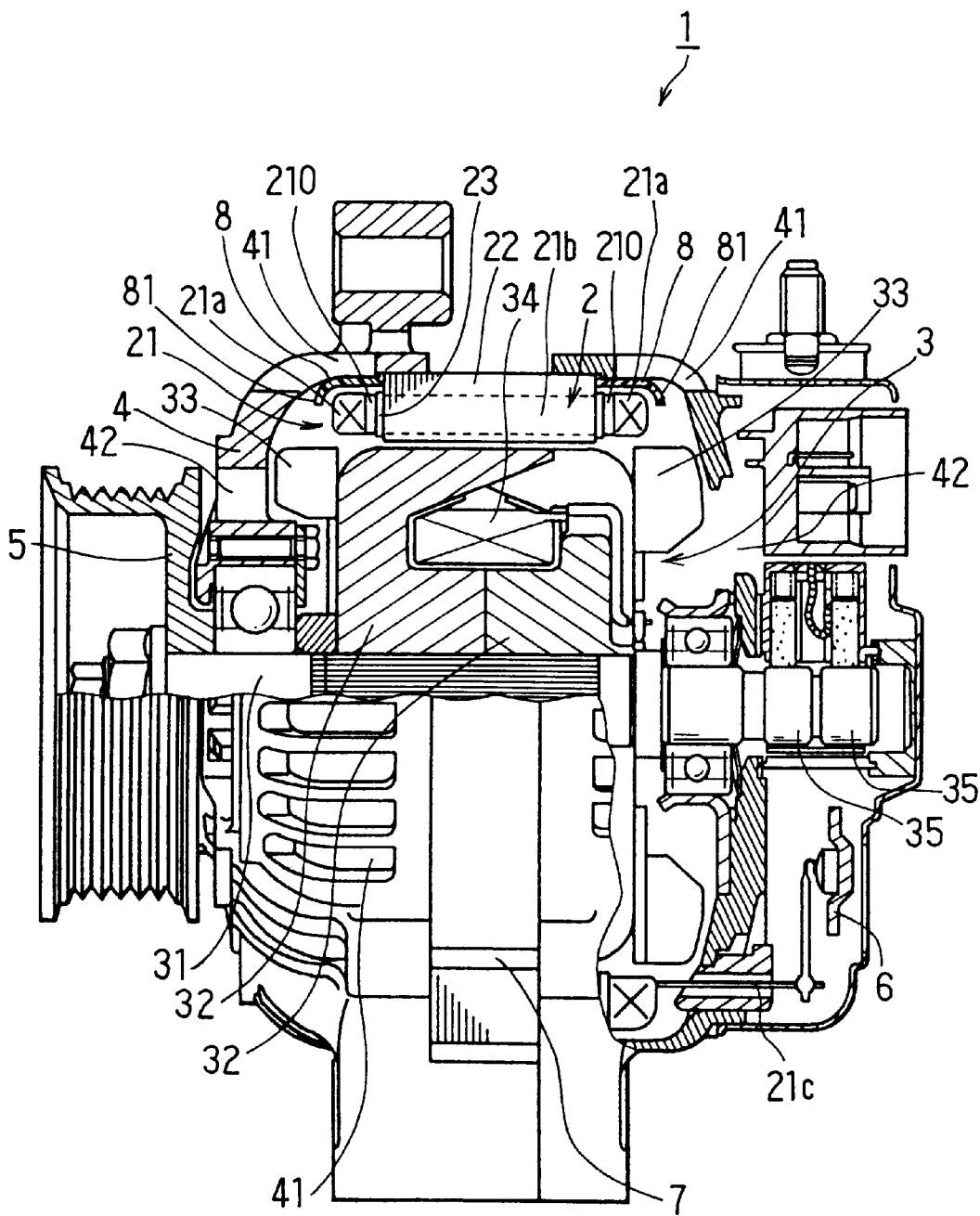
FIG. 1 is a cross-sectional side view of a vehicle AC generator according to a preferred embodiment of the invention.
Figure 2:
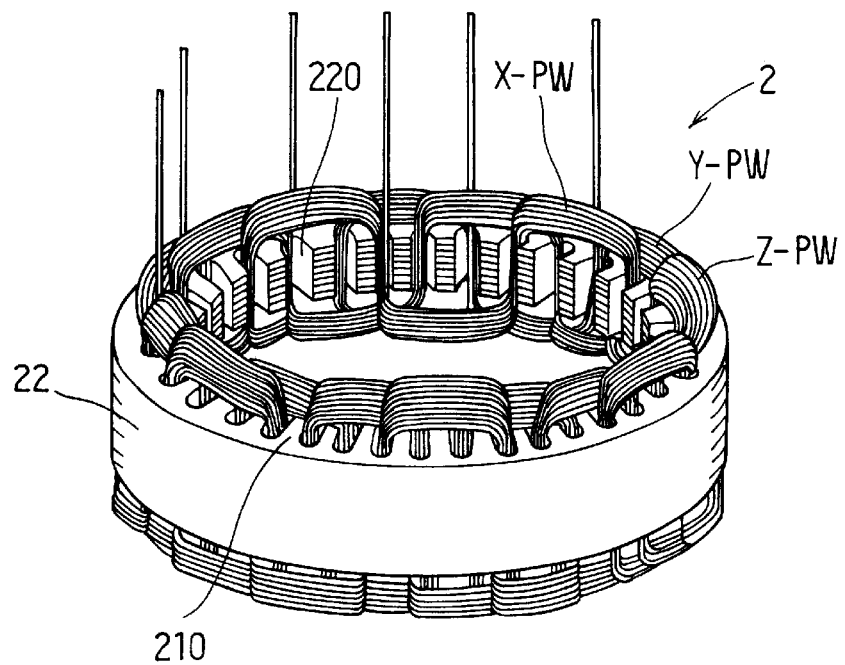
FIG. 2 is a perspective view of a stator of the AC generator according to the preferred embodiment.
Figure 3:
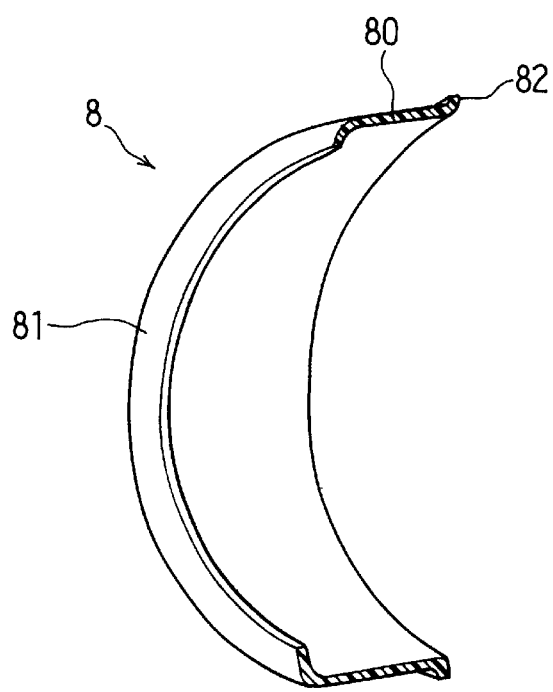
FIG. 3 is a schematic fragmentary perspective view of a wall member of the AC generator according to the preferred embodiment.

As shown in FIGS. 1 and 3, a cylindrical wall member 8 is disposed between the coil-ends 21*a* and the frame. The wall member 8 is made of a resinous insulation member and has a cylindrical portion 80 enclosing the coil ends 21*a*, an outwardly bending support portion 82 and an inwardly bending flange portion 81. The wall member 8 may be a mold or a member formed from a resinous plate. The flange portion 81 partly covers the top of the coil ends 21*a*.

In operation, cooling air flows in directions shown in FIG. 4. When the rotor rotates, the cooling air is taken by the cooling fan 33 from the opening 42 into the inside and driven radially outward. The fan 210 formed at the base of the claw poles drives a part of the cooling air toward the coil-end-gaps 210. Because the cooling air is driven by the cooling fan 33 to flow at a high speed between the top of the coil ends 21*a* and the frame 4, atmospheric pressure at the edge of the wall member 8 is lowered. In other words, the wall member 8 narrows the cooling air passage at the flange portion 81 to decrease the atmospheric pressure under Bernoulli's phenomenon. As a result, the cooling air flowing through the coil-end-gaps 210 is guided by the wall member 8 to flow along the radially outside surface of the coil-ends 21*a* and toward the flange portion 81 before it is discharged outside from the opening 41. Thus, the cooling air cools the outside surface of the coil-ends 21*a* effectively. This also controls increase in the resistance of the coil-ends 21*a*, thereby suppressing the Joule loss thereof. In addition, the wall member insulates the coil-ends from the frame even if the coil-ends 21*a* become bulky.

Figure 5:
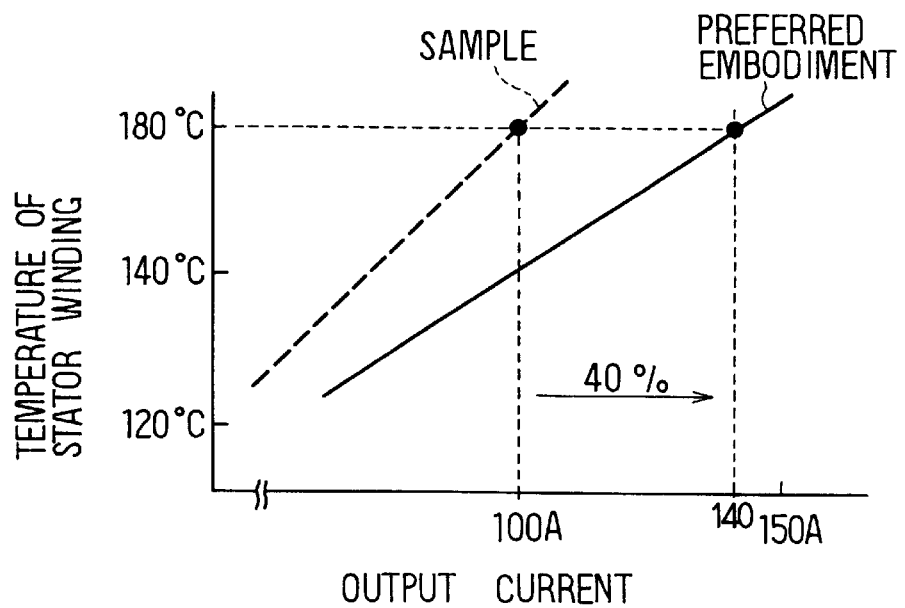
FIG. 5 is a graph showing a relationship between temperature of a stator winding and output current of the AC generator according to the preferred embodiment.

For example, two AC generators that have outside diameter of 130 mm, an AC generator according to the preferred embodiment and a sample AC generator that has no wall member between the frame and the coil-ends, were compared with each other. As shown in FIG. 5, the temperature of the stator winding of the AC generator according to the preferred embodiment when generating current of 140 ampere was the same as the temperature of the stator winding of the sample when generating current of 100 ampere. That is, the AC generator according to the preferred embodiment of the invention can generate about 40% higher power than the sample. Because the Joule loss is proportional to a square of the output current, the Joule loss of 100 ampere is proportional to $100^2$, and the Joule loss of 140 ampere is proportional to $140^2$, which is about twice as many as $100^2$. In other words, the cooling arrangement of the AC generator according to the preferred embodiment is twice as effective as the cooling arrangement of the sample.

Figure 6:
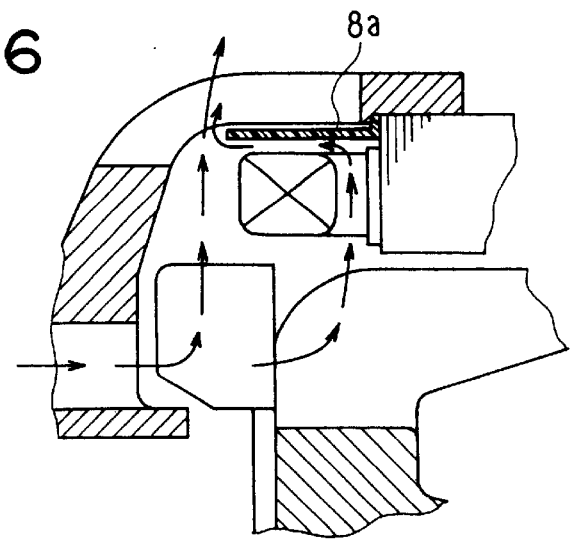
FIG. 6 is a schematic fragmentary cross-sectional side view of a portion around coil ends of an AC generator according to a variation of the preferred embodiment of the invention.
Figure 7:
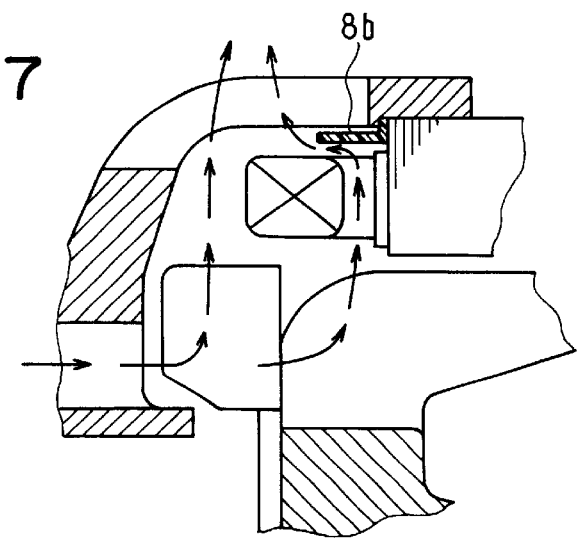
FIG. 7 is a schematic fragmentary cross-sectional side view of a portion around coil ends of the AC generator according to another variation of the preferred embodiment of the invention.

As a variation, the flange portion 81 can be omitted, as shown in FIG. 6. As another variation, the wall member 8 can be as high as the coil-end-gap, as shown in FIG. 7. It is not always necessary that the wall member 8 is completely cylindrical. The wall member 8 can be semi-cylindrical or can be divided into some pieces.

Figure 8:
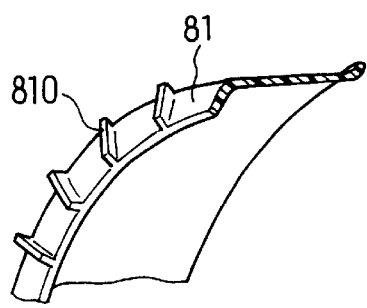
FIG. 8 is a schematic fragmentary perspective view of a wall member of an AC generator according to another variation of the preferred embodiment of the invention.

A plurality of cooling fins 810 can be formed on the radially outside surface of the wall member, as shown in FIG. 8.

In the foregoing description of the present invention, the invention has been disclosed with reference to specific embodiments thereof It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A vehicle rotary electric machine, comprising:
   a rotor including a pole core which has a plurality of claw-shaped pole pieces forming a cooling fan;
   a second cooling fan fixed to an end of said rotor;
   a stator disposed to be coupled with said rotor and including a stator core which has a plurality of slots and a stator winding, said stator winding including a plurality of in-slot portions disposed in said plurality of slots and a plurality of outside portions extending from said slots and forming a plurality of coil-ends at an axial end of said stator core;
   a frame for supporting said rotor and said stator, said frame having a plurality of openings at an outer periphery thereof, wherein a coil-end-gap is formed along said axial end of said stator core between said outside portions extending from a pair of adjacent slots; and
   a wall member is disposed between said frame and said coil ends, said wall member is partly cylindrical to enclose said plurality of coil ends.

2. A rotary electric machine, comprising:
   a rotor including a pole core which has a plurality of claw-shaped pole pieces forming a cooling fan;
   a second cooling fan fixed to an end of said rotor;
   a stator disposed to be coupled with said rotor and including a stator core which has a plurality of slots and a stator winding, said stator winding including a plurality of in-slot portions disposed in said plurality of slots and a plurality of outside portions extending from said slots and forming a plurality of coil-ends at an axial end of said stator core;
   a frame for supporting said rotor and said stator, said frame having a plurality of openings at an outer periphery thereof, wherein a coil-end-gap is formed along said axial end of said stator core between said outside portions extending from a pair of adjacent slots; and
   a wall member is disposed between said frame and said coil ends, said wall member has an inwardly bending flange at an axial end thereof and is as high as said coil ends.

3. A vehicle rotary electric machine, comprising:
   a rotor including a plurality of claw-shaped pole pieces forming a first cooling fan;
   a second cooling fan fixed to an end of said rotor;
   a stator disposed outside said rotor to be coupled therewith and including a stator core which has a plurality of slots and a stator winding, said stator winding including a plurality of in-slot portions disposed in said plurality of slots and a plurality of outside portions extending from said slots and forming a plurality of coil-ends at an axial end of said stator core and a plurality of coil-end-gaps between base portions of said outside portions;

a frame for supporting said stator from outside, said frame having a plurality of air discharging openings at an outer periphery thereof; and a wall member disposed between said frame and said coil ends for guiding cooling air through said coil-end-gaps along outside surfaces of said plurality of coil ends, wherein said wall member has an inwardly bending flange at an axial end thereof.

4. A vehicle rotary electric machine comprising:

a rotor including a plurality of claw-shaped pole pieces forming a first cooling fan at the base portion thereof;

a second cooling fan fixed to an end of said rotor;

a stator core disposed outside said rotor and having a plurality of slots;

a stator winding including a plurality of in-slot portions disposed in said plurality of slots and a plurality of outside portions extending from said slots and forming a plurality of coil-ends at an axial end of said stator core and a plurality of coil-end-gaps disposed along said axial end between said outside portions extended from each pair of adjacent slots;

a frame for supporting said stator from outside, said frame having a plurality of air discharging openings at an outer periphery thereof; and a wall member disposed between said frame and said coil ends for guiding cooling air through said coil-end-gaps along outside surfaces of said plurality of coil ends, said wall member having a flange portion for narrowing cooling air passage between said second cooling fan and said air discharging openings.

5. The vehicle rotary electric machine as claimed in claim 4, wherein
said wall member is made of insulation material.

6. The rotary electric machine as claimed in claim 5, wherein
said wall member is as high as said coil ends.

7. A vehicle rotary electric machine comprising:

a rotor including a plurality of claw-shaped pole pieces forming a first cooling fan at the base portion thereof;

a second cooling fan fixed to an end of said rotor;

a stator core disposed outside said rotor and having a plurality of slots;

a stator winding including a plurality of in-slot portions disposed in said plurality of slots and a plurality of outside portions extending from said slots and forming a plurality of coil-ends at an axial end of said stator core and a plurality of coil-end-gaps disposed along said axial end between said outside portions extended from each pair of adjacent slots;

a frame for supporting said stator from outside, said frame having a plurality of air discharging openings at an outer periphery thereof; and an cylindrical insulation wall member disposed between said frame and said coil ends for guiding cooling air through said coil-end-gaps along outside surfaces of said plurality of coil ends, said wall member having a flange portion for lowering atmospheric pressure of a cooling air passage between said second cooling fan and said air discharging openings.

* * * * *